United States Patent
Hulsen

(10) Patent No.: US 8,410,728 B2
(45) Date of Patent: Apr. 2, 2013

(54) METHOD OF AND DEVICE FOR CONTROLLING SHED LIGHTING

(75) Inventor: Paul Hulsen, Moerstraten (NL)

(73) Assignee: Lely Patent N.V., Maassluis (NL)

( * ) Notice: Subject to any disclaimer, the term of this patent is extended or adjusted under 35 U.S.C. 154(b) by 865 days.

(21) Appl. No.: 12/554,115

(22) Filed: Sep. 4, 2009

(65) Prior Publication Data

US 2010/0060174 A1 Mar. 11, 2010

(30) Foreign Application Priority Data

Sep. 5, 2008 (NL) .................................... 1035899

(51) Int. Cl.
*H05B 37/02* (2006.01)
(52) U.S. Cl. .................... 315/360; 315/159; 315/307
(58) Field of Classification Search ........ 315/149–159, 315/291, 294, 307, 312, 360
See application file for complete search history.

(56) References Cited

U.S. PATENT DOCUMENTS

| | | | | |
|---|---|---|---|---|
| 4,701,669 A | * | 10/1987 | Head et al. | 315/155 |
| 5,343,121 A | * | 8/1994 | Terman et al. | 315/158 |
| 5,357,170 A | * | 10/1994 | Luchaco et al. | 315/159 |
| 6,583,573 B2 | * | 6/2003 | Bierman | 315/149 |
| 7,868,557 B2 | * | 1/2011 | Deurenberg et al. | 315/149 |
| 8,111,008 B2 | * | 2/2012 | Veskovic et al. | 315/291 |

FOREIGN PATENT DOCUMENTS

| | | |
|---|---|---|
| DE | 3741479 A1 | 7/1989 |
| NL | 1021636 C | 6/2004 |
| WO | 0101784 A1 | 1/2001 |

* cited by examiner

*Primary Examiner* — Tung X Le
(74) *Attorney, Agent, or Firm* — Hoyng Monegier LLP; Coraline J. Haitjema; David P. Owen

(57) ABSTRACT

A method of, and a device for controlling a shed lighting, and a shed provided therewith. To support daylight, lamps are switched on, but only in the case when the measured intensity is too low and, moreover, the time in which the daylight intensity could become sufficient is too short to achieve a desired period of time with a minimum light intensity. This saves energy and service life of lamps.

17 Claims, 1 Drawing Sheet

METHOD OF AND DEVICE FOR CONTROLLING SHED LIGHTING

CROSS REFERENCE TO RELATED APPLICATIONS

This application claims priority from the Netherlands application number 1035899 filed on 5 Sep. 2008, the contents of which are hereby incorporated by reference in their entirety.

BACKGROUND OF THE INVENTION

1. Field of the Invention

The invention relates generally to a method of controlling shed lighting and a device for controlling shed lighting.

2. Description of the Related Art

From the article 'Betere verlichting geen sprong in het duister' by G. Biewenga and A. Winkel, Praktijkkompas, Rundvee 17 (2003)1, it is known to adhere, for example for lactating cows, to a light regime of daily 14-16 hours light, with a light intensity of at least 150-200 lx, and 6-8 hours darkness. For the advantages of such a regime reference is made to said article.

A drawback of the above-mentioned method is that in many cases it is not optimally energy-saving.

BRIEF SUMMARY OF THE INVENTION

According to the invention, this object is achieved by providing a method of controlling shed lighting, wherein the shed comprises daylight, a plurality of additional lighting and at least one lighting intensity sensor. The method comprises: measuring a light intensity in the shed; controlling, depending on the measured light intensity, at least a part of the additional lighting, in order to daily provide a light duration with a first length and a minimum light intensity $I_{light}$ in the shed; measuring, for a current day, a total time elapsed in which the measured light intensity amounts to at least $I_{light}$, determining an evening twilight point of time at which, using only the daylight, the light intensity can no longer reach the value light; and only switching on at least a part of the additional lighting when a momentary intensity is smaller than $I_{light}$ and the light duration minus the total time elapsed is longer than the momentary time still to elapse until the evening twilight point of time.

Through such a method the switching on additional lighting is prevented when this is not yet necessary. When there is only temporarily insufficient light, in the case of a rain shower or the like, and the light intensity can be sufficient again after the shower has passed, switching on the additional lighting may not yet be necessary, if after the rain shower or the like there is still sufficient time with a sufficiently high light intensity. This saves energy and lamp service life, because the number of times the lamps are switched on is reduced too. It should be noted that, by measuring the total time elapsed, the time during which, for example, a farmer, veterinary surgeon or the like switches on the lighting will automatically also be taken into consideration. As a result, the above-mentioned advantage need not be limited to summer days, with long daylight length, in particular with a day length longer than the light duration. Advantageously, the additional lighting is thus also independently operable. Of course, at least the part of the additional lighting will be switched on if the prevailing light intensity is below the value $I_{light}$.

In this case, the intensity can be measured either continuously or with regular or non-regular intervals of, for example, approximately 1 minute. The latter prevents a too fast, "nervous" control. It is also possible to work with intensity values which represent an average of the past time, for example the past minute.

Daylight may be admitted into the shed through any suitable daylight mechanism, such as windows, dome lights, (semi)transparent or translucent plates, apertures, etcetera.

By $I_{light}$ is meant an animal-dependent threshold light intensity, which amounts, for example for lactating cows, to approximately 150-200 lx. Likewise, by $I_{dark}$ is meant an animal-dependent lower limit light intensity, in particular less than 75 lx, more in particular less than 10 lx, in the shed, in which case the light level is so low that a period of rest begins.

Advantageously, the method according the present invention comprises measuring the intensity at a plurality of places, wherein the additional lighting are controlled in dependence on the light intensity measured at the plurality of places. For example, the light intensity for a place which is relatively farther away from a window will sooner drop below a threshold than for a place which is relatively closer to a window. Accordingly, it is then possible to switch on sooner additional lighting that lights mainly the place in question.

Determining an evening twilight point of time at which, using only the daylight, the light intensity can no longer reach the value $I_{light}$, can take place in a variety of manners. It is possible, for example, to determine date-dependent and time-dependent reference values, for example on sunny days or on the basis of theoretical calculations. It is also possible to extrapolate the curve of maximum values on one day. In this case, it is possible, for example, to derive the course of the maximum value from temporary maxima measured (during sunny periods), and wherein the morning point of time of exceeding the threshold is reflected with respect to the point of time of the absolute maximum. Also in this case, further support of the calculations can take place on the basis of theoretic models. In this case, it may be advantageous to measure the light intensity of the daylight directly, i.e. outside the shed. On the other hand, it could make sense to do this on the contrary inside the shed, in order to be able to discount the state of cleanliness of the daylight.

Advantageously, the method according the present invention comprises applying a darkening mechanism, in which case the darkening mechanism reduces the measured light intensity to below the value $I_{dark}$ if the total time elapsed exceeds the value of the light duration. In particular in summer, this can be the case for lactating cows. However, it is further pointed out that for other animals a quite different light regime may apply. For example, for dry cows it is found to be advantageous to have a regime of 16 hours "dark" and 8 hours "light". In such cases, using the darkening mechanism will also make sense in other seasons. The darkening mechanism will in particular reduce the intensity of light admitted by the daylight, and it will be possible for them to comprise, for example, controllable roll-down shutters, curtains, window shutters and the like.

In accordance with various embodiments of the present invention, the method comprises: selecting a starting point of time and an ending point of time of the light duration, determining a morning twilight point of time, at which by only using the daylight the measured lighting intensity can amount to at least $I_{light}$, and shifting, preferably automatically, the light duration over time, with the length of the light duration remaining constant, and in such a manner that the overlap between the light duration and the period between morning twilight point of time and evening twilight point of time is increased. This is already possible if the morning twilight point of time is before the starting point of time and the evening twilight point of time is before the ending point of time, in which case the starting point of time and the ending point of time can be shifted to an earlier point of time, or, if the morning twilight point of time is after the starting point of time and the evening twilight point of time is after the ending point of time, in which case the starting point of time and the ending point of time can be shifted to a later point of time. In fact, the overlap can already increase if, at one side of the light duration, it increases to a greater extent than it decreases at the other side thereof. All this is done for example manually, in particular in the case of great day lengths, but preferably automatically, as a result of the fact that a control device determines, for example, a day length as the period of time between morning twilight point of time and evening twilight point of time, and compares it with the light duration, at least with the position in time thereof with respect to the morning and evening twilight points of time.

In one example, when a user has set the system at a light duration of 16 hours between 6.30 and 22.30, in winter the additional lighting will be on for some time both in the morning and in the evening. As the summer progresses, the daylight period will become longer, and, for example, the morning point of time at which there is sufficient daylight will be before the beginning of the light duration, whereas in the evening the daylight period will not yet be sufficient, resulting in lamps being switched on. If desired, this situation can be continued, but in order to save energy it may be decided to shift the light duration if this makes sense, i.e. if reducing the evening switched-on duration by advancing the ending point of time of the light duration will provide a larger switched-on duration saving than advancing the starting point of time in the morning would lengthen the switched-on duration of the lamps. Advantageously, the light duration is shifted in such a manner that there will be no more than one switched-on period per day, i.e. that either the starting point of time of the light duration coincides with the morning twilight point of time, or the ending point of time coincides with the evening twilight point of time.

In the above described example the situation may be such that the evening twilight point of time is at 21.00 hours. It is then advantageous to shift the light duration in such a manner that the ending point of time will also be at 21.00, thus one and a half hour earlier, so that the lamps will in any case not be on in the evening, but only in the morning, and only if the day length is insufficient. In the case of sufficient day length, the lamps will not be switched on at all. If the days become shorter, the lamps will be on for a longer time in the morning until they will be on in the morning for at least one hour and a half before the morning twilight point of time begins. In that case, it does not make difference whether the lamps are on in the morning or in the evening, and it makes sense to return to the initially set light duration scheme between 6.30 and 22.30. All this can be set manually by the user, or automatically, on the basis of values calculated and input beforehand for the morning and evening twilight point of times, or on the basis of measured values thereof for the past days, such as for example a period of the five preceding days.

As described in the above-mentioned example, the present embodiment comprises either shifting the starting point of time and the ending point of time to an earlier point of time, if the morning twilight point of time is before the starting point of time and the evening twilight point of time is before the ending point of time, or shifting the starting point and the ending point of time to a later point of time with the length of the light duration remaining constant, if the morning twilight point of time is after the starting point of time and the evening twilight point of time is after the ending point of time. Advantageously, the ending point of time is shifted back to on or before the evening twilight point of time.

The invention also relates to a shed lighting device, comprising at least a lighting intensity sensor which is configured for measuring a light intensity, at least a controllable additional lighting, and a controller which is configured for controlling the controllable additional lighting on the basis of the measured light intensity, wherein the controller is configured for performing the method according to the present invention, in particular for measuring, for the current day, the total time elapsed in which the measured light intensity amounts to at least $I_{light}$, for determining an evening twilight point of time at which the light intensity can no longer reach the value $I_{light}$, and only switching on at least a part of the additional lighting when the momentary intensity is smaller than $I_{light}$ and the momentary time still to elapse until the evening twilight point of time is shorter than a desired light duration minus the total time elapsed. Also here, the evening twilight point of time is the evening point of time at which the maximum light intensity to be obtained drops below the desired $I_{light}$ level. Also in this case, $I_{light}$, $I_{dark}$, respectively, are selected in accordance with a desired light regime.

Such a lighting system may, for example, realize the selected light regime in a shed at lower energy and maintenance costs, because the system makes proper use of possibly available periods of time at which the intensity of the daylight, after a temporary decrease, can become sufficient again. This daylight enters the shed via the daylight mechanism already mentioned above. Advantageously, the shed lighting device comprises darkening mechanism controllable by the control device, which is configured for darkening daylight mechanism.

Advantageously, the control device is configured for inputting by a user a starting point of time and an ending point of time of the light duration. These are then basis values for said light duration, which can subsequently be adjusted, either by the user, or automatically, if this would provide, for example, energy savings.

In various embodiments according to the present invention, the control device is configured for shifting the light duration over time, with the length of the light duration remaining constant, and in such a manner that the overlap between the light duration and the period between morning twilight point of time and evening twilight point of time is increased, with advantages corresponding to those described above for the method.

The invention also relates to a shed comprising daylight, which is also provided with the shed lighting device according to the invention. Both for the shed lighting device and for the shed according to the invention it applies that the particular measures for the method according to the invention apply unimpaired.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
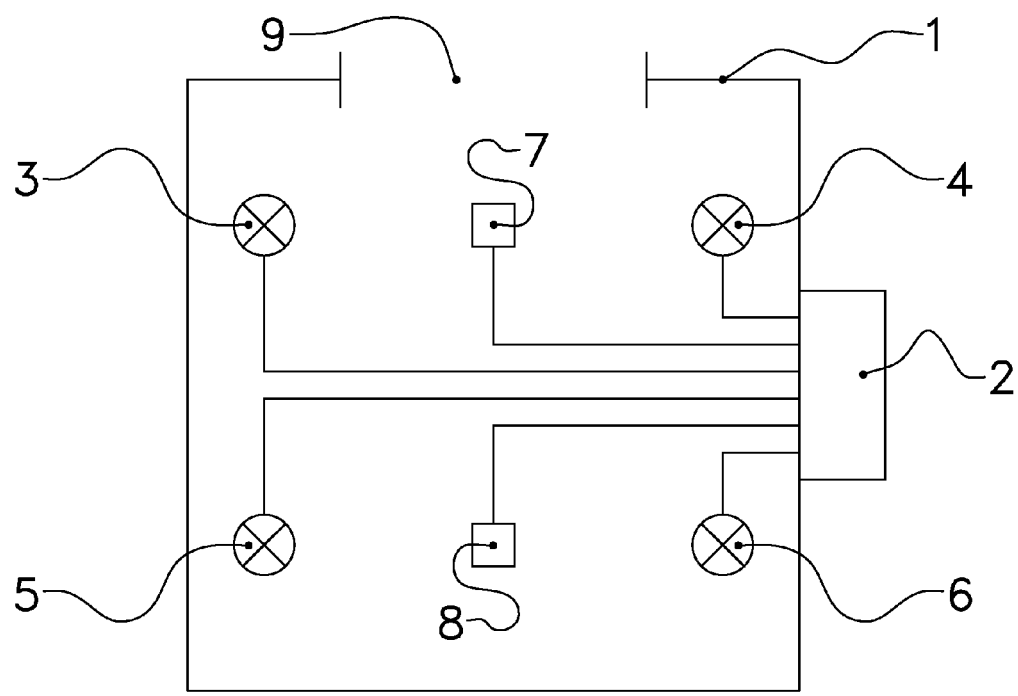
FIG. 1 is a schematic top view of a shed lighting system according to the invention.

The following is a description of certain embodiments of the invention, given by way of example only and with reference to the drawings. FIG. 1 shows a shed 1 with a control device 2 which is connected to four additional lighting 3 to 6, as well as to two sensors 7 and 8. Daylight is denoted by 9.

The control device usually comprises a computer which is placed either in or near the shed, or is connected thereto via a cable or network. In the latter case, it can be controlled remotely, such as by a farmer from an office. It is also possible to connect the computer to an animal recognition device, so that the control device 2 is able to adjust the lighting regime to the recognized animals.

The additional lighting 3-6 are, for example, fluorescent tubes, sodium vapour lamps or metal halide lamps or the like. They can in principle be disposed anywhere in the shed 1, but preferably at places where there is less light from daylight 9, such as windows. Not shown are darkening mechanisms, which are able to stop light from daylight 9 when there is a need for a dark period, for example for dry cows. Said darkening mechanism comprise, for example, roll-down shutters or window shutters, connected to the control device 2.

The sensors 7 and 8 are light intensity meters, such as photo cells. Here, they are positioned at two different places, in order to be able to process the influence of daylight 9. In this manner it is possible for the control device 2 to operate the additional lighting 3-6 locally according to need, on the basis of the locally measured lighting intensity. For example, the lamps 3 and 4 will be switched on less soon, because daylight still enters via the window 9, there where sensor 8 already measures a too low light intensity. For the additional lighting, the daylight and for the sensors it applies that these may be provided in any desired number.

The lighting regime which can be achieved depends on the to-be set values of the threshold $I_{light}$ and, if desired, $I_{dark}$, and on the desired period of time the intensity is above $I_{light}$, below $I_{dark}$, respectively. These may be set in an animal-group-dependent or even animal-dependent manner.

Figure 2:
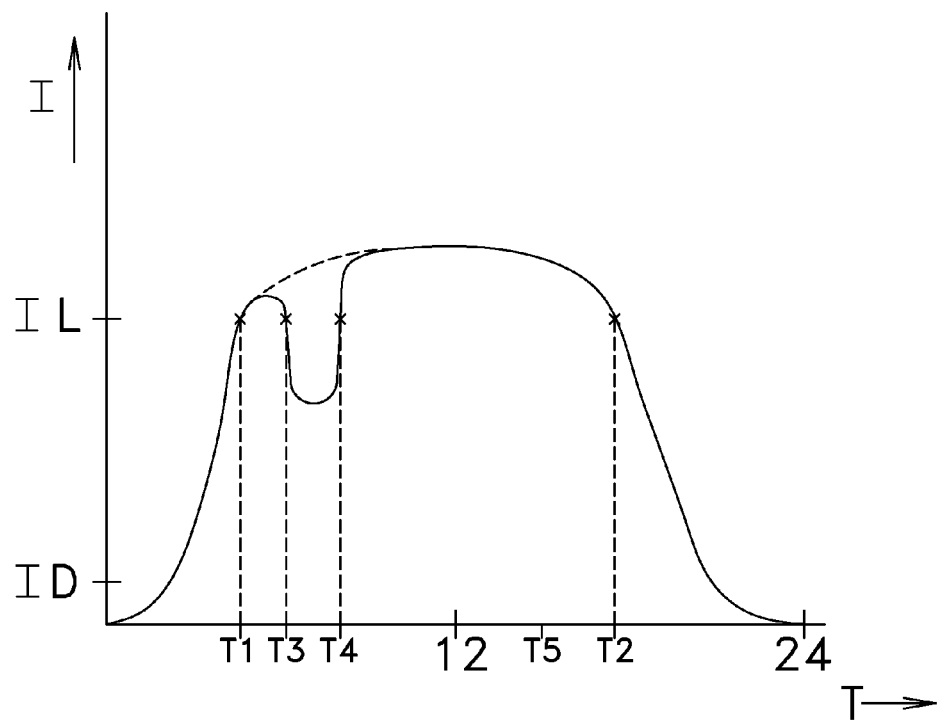
FIG. 2 is a diagram with light intensities illustrating the method according to the invention.

The method according to the invention will be explained in further detail with reference to FIG. 2, which shows a light intensity or lighting intensity as a function of time over 24 hours. Here, a maximally attainable intensity, at sunny weather, is indicated by a dotted line, and an actually measured intensity is indicated by the solid line. As these lines coincide for the greater part, the measured day is found to be a sunny day, with between t1 and t2 the chance of sufficient daylight to come above the threshold of $I_{light}$. Only between t3 and t4, the light intensity fell back below the threshold level $I_{light}$, for example because of a dark shower cloud. In conventional systems, the light will then usually be switched on, in order to obtain the minimum light intensity. Moreover, in the afternoon a darkening mechanism will perhaps have to be used, in order to prevent that the animals will have too much light in the shed.

According to the present invention, it is examined whether there are still sufficient possibilities of natural lighting. Suppose, by way of example, that the regime is: during a period of time T light, i.e. an intensity above $I_{light}$, and further the natural evening twilight plus dark. And suppose that in this case t1+T is equal to t5. It will now be clear that, on a completely sunny day, in the shown case there will be more daylight than required, and that, as a result thereof, either darkening mechanism will have to be used, or the surplus of light will have to be accepted.

There is further defined the time elapsed tv, in which the criterion of sufficient light intensity has been met. Now, furthermore, the period of time from t3 to t4 is smaller than the margin from t5 to t2. It is thus not necessary to switch on the lamps between t2 and t3. It is then sufficient to wait. Only if the remaining time in which the natural light intensity is sufficient to complete the time already elapsed to T, thus if $t2-t \geq T-tv$, the lamps can remain off. In the other cases, at least one lamp should indeed be switched on.

Thus, the invention has been described by reference to certain embodiments discussed above. It will be recognized that these embodiments are susceptible to various modifications and alternative forms well known to those of skill in the art. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of controlling a shed lighting, wherein the shed lighting comprises daylight, a plurality of additional lighting and at least one lighting intensity sensor, the method comprising:
   measuring a light intensity in the shed;
   controlling, depending on the measured light intensity, at least a part of the additional lighting, in order to daily provide a light duration with a first length and a minimum light intensity $I_{light}$ in the shed;
   measuring, for a current day, a total time elapsed in which the measured light intensity amounts to at least $I_{light}$;
   determining an evening twilight point of time at which, using only the daylight, the light intensity no longer reaches the value $I_{light}$; and
   only switching on at least a part of the additional lighting when a momentary intensity is smaller than $I_{light}$ and the light duration minus the total time elapsed is longer than the momentary time still to elapse until the evening twilight point of time.

2. The method according to claim 1, wherein the shed is configured for keeping dairy animals.

3. The method according to claim 2, where the shed is configured for keeping cows.

4. The method according to claim 1, wherein the daylight is provided to the shed through a daylight mechanism comprising at least one of a window, a dome, and an at least partially transparent or translucent plate.

5. The method according to claim 1, further comprising controlling at least a part of the additional lighting in a darkness duration with a second length and a substantially lower maximum light intensity $I_{dark}$ in the shed.

6. The method according to claim 5, wherein the maximum light intensity $I_{dark}$ is less than 75 lx.

7. The method according to claim 6, wherein maximum light intensity $I_{dark}$ is less than 10 lx.

8. The method according to claim 5, comprising applying a darkening mechanism, wherein the darkening mechanism reduces the measured light intensity to below the value $I_{dark}$ if the total time elapsed exceeds the value of the light duration.

9. The method according to claim 1, comprising measuring the intensity at a plurality of places, wherein the additional lighting is controlled in dependence on the light intensity measured at the plurality of places.

10. The method according to claim 1, comprising:
    selecting a starting point of time and an ending point of time of the light duration;
    determining a morning twilight point of time at which, using only the daylight, the measured light intensity can amount to at least $I_{light}$; and
    shifting the light duration over time, with the length of the light duration remaining constant, and in such a manner that the overlap between the light duration and the period between morning twilight point of time and evening twilight point of time is increased.

11. The method according to claim 10, wherein the ending point of time is shifted back to at or before the evening twilight point of time.

12. The method according to claim 10, wherein the shifting of the light duration over time is configured to be automatic.

13. A shed lighting device, comprising:
a daylight mechanism;
at least one lighting intensity sensor configured for measuring a light intensity;
at least one controllable additional lighting; and
at least one control device controlling the controllable additional lighting on the basis of the measured light intensity, wherein the control device is configured to:
measure a total time elapsed in which the measured light intensity amounts to at least $I_{light}$ for a current day,
determine an evening twilight point of time at which the light intensity no longer reaches the value $I_{light}$, and
switch on only at least a part of the additional lighting when a momentary intensity is smaller than $I_{light}$ and a momentary time still to elapse until the evening twilight point of time is shorter than a desired light duration minus the total elapsed time.

14. The shed lighting device according to claim 13, wherein the lighting intensity sensor automatically measures light intensity.

15. The shed lighting device according to claim 13, further comprising a darkening mechanism configured for lessening daylight and controllable by the control device.

16. The shed lighting device according to claim 13, wherein the control device is configured for inputting by a user a starting point of time and an ending point of time of the light duration.

17. The shed lighting device according to claim 13, wherein the control device is configured for shifting the light duration over time, with a length of the light duration remaining constant, and in such a manner that an overlap between the light duration and the period between morning twilight point of time and evening twilight point of time is increased.

* * * * *